(12) United States Patent
Pich et al.

(10) Patent No.: US 8,057,684 B2
(45) Date of Patent: *Nov. 15, 2011

(54) INSTALLATION FOR THE FLOCCULATION OF SLUDGE LOADED WITH SUSPENDED MATTER, METHOD USING THE INSTALLATION

(75) Inventors: Rene Pich, Saint Etienne (FR); Philippe Jeronimo, Montrond les Bains (FR)

(73) Assignee: S.P.C.M. SA, St. Etienne (FR)

( * ) Notice: Subject to any disclaimer, the term of this patent is extended or adjusted under 35 U.S.C. 154(b) by 470 days.

This patent is subject to a terminal disclaimer.

(21) Appl. No.: 12/249,324

(22) Filed: Oct. 10, 2008

(65) Prior Publication Data

US 2009/0095688 A1 Apr. 16, 2009

Related U.S. Application Data

(60) Provisional application No. 60/982,253, filed on Oct. 24, 2007.

(30) Foreign Application Priority Data

Oct. 12, 2007 (FR) .................................... 07 58255

(51) Int. Cl.
*C02F 1/56* (2006.01)
*C02F 11/14* (2006.01)

(52) U.S. Cl. ........ 210/734; 210/732; 210/738; 210/192; 210/206; 241/21; 241/38; 241/41

(58) Field of Classification Search ................... 210/192
See application file for complete search history.

(56) References Cited

U.S. PATENT DOCUMENTS

| 4,113,688 | A | * | 9/1978 | Pearson | 523/324 |
| 4,141,957 | A | | 2/1979 | Szabolcs et al. | |
| 4,603,156 | A | * | 7/1986 | Sortwell | 523/324 |
| 4,845,192 | A | | 7/1989 | Sortwell et al. | |
| 4,929,086 | A | * | 5/1990 | Geyer | 366/76.93 |
| 5,857,773 | A | * | 1/1999 | Tammelin | 366/178.1 |
| 6,045,070 | A | * | 4/2000 | Davenport | 241/60 |
| 7,048,432 | B2 | * | 5/2006 | Phillippi et al. | 366/164.1 |
| 7,736,497 | B2 | * | 6/2010 | Fout et al. | 210/143 |
| 7,762,340 | B2 | * | 7/2010 | Pich et al. | 166/369 |
| 7,814,977 | B2 | * | 10/2010 | Pich et al. | 166/275 |
| 2004/0256106 | A1 | | 12/2004 | Phillippi et al. | |

FOREIGN PATENT DOCUMENTS

| DE | 2019696 A1 | 11/1971 |
| EP | 0988887 A | 3/2000 |
| WO | WO 9614923 A | 5/1996 |

OTHER PUBLICATIONS

The French Search Report for FR 0758255, dated Jun. 12, 2008.

* cited by examiner

*Primary Examiner* — Peter A Hruskoci
(74) *Attorney, Agent, or Firm* — Heslin Rothenberg Farley & Mesiti P.C.

(57) ABSTRACT

Installation for flocculation of water or sludge loaded with suspended matter comprising in succession: a polymer storage hopper, a polymer grinding device, and a line, pipe or other conveyor for transferring the polymer solution to the water or the sludge to be treated. The grinder device includes a wetting cone in which the polymer is poured, and at the bottom end of the cone: a chamber for grinding and removing the dispersed polymer comprising: a rotor, a stator, and a ring fed by a secondary water circuit. A method implementing the installation is also provided.

13 Claims, 2 Drawing Sheets

INSTALLATION FOR THE FLOCCULATION OF SLUDGE LOADED WITH SUSPENDED MATTER, METHOD USING THE INSTALLATION

CROSS REFERENCE TO RELATED APPLICATIONS

This application claims priority of French application No. 0758255 filed Oct. 12, 2007, and U.S. provisional application No. 60/982,253 filed Oct. 24, 2007, the full disclosures of which are hereby incorporated by reference herein.

BACKGROUND ART

The invention relates to an installation for the flocculation of water or sludge loaded with suspended matter, such as for example sludge from dredging, from the mineral, urban or paper and pulp industry. It also relates to a flocculation method implementing the said installation.

Sludges can be flocculated by means of high molecular weight polymers and in particular by means of polyacrylamide. These polymers are water-soluble polymers generally used in powder form whereof the main drawback is that they dissolve in water with difficulty.

In most cases, particularly for low and medium consumption, the polymer is dispersed in the dissolution water using an ejector or a wetting apparatus avoiding the formation of lumps, called "fisheyes". The solution concentration remains low for high molecular weight products, and this dissolution must take place in tanks of sufficient size to obtain complete dissolution.

In certain cases, the polymer powder is injected directly into the water of the sludge to be treated, at the head of long transport lines, particularly in hot suspensions (30 to 60° C.). The powder dissolves during the transport and flocculates the solids. However, due to turbulence, the flocs are mechanically broken, causing high extra consumption of polymer. The installation is simple, but the yield is low.

Another solution is to avoid the complete dissolution of the polymer. In this case, the aggregation of the chains leads to apparent molecular weights much higher than the true molecular weights of the polymer. This is used especially for the flocculation of municipal sludge on centrifuge. In this case—the high concentration of the polymeric solution (5-10 g/litre of polymer for example)—the short dilution time (15 to 30 minutes)—and the very fast contacting time with the suspension (before or at the time of the polymer injection into the water to be treated) prevent the separation of the macromolecular chains, thereby leading to an increase in the size and strength of the flocs. A person skilled in the art has found in particular that the molecular aggregates obtained have the same characteristics as if use had been made of completely dissolved higher molecular weight polymers.

One alternative solution is to completely dissolve the polymer before injecting it into the suspension to be treated. In this case, dissolution generally takes place with polymer solutions in concentrations of 1 g/l for treating water and 3 g/l for sludge. Conventionally, this dissolution has the major drawbacks of requiring:

the use of large size and costly equipment, particularly and usually with two tanks, one for preparation and one for maturation/injection,
and preparation (residence) times that are generally longer than 1 hour.

Documents U.S. Pat. No. 4,874,588 and U.S. Pat. No. 4,845,192 describe a polymer dispersion apparatus which reduces the size of the powder to 100-200 microns and thereby shortens the dissolution time. However, this apparatus has the defect of clogging rapidly due to the consistency of the polyacrylamide which becomes particularly viscous in contact with the water and forms aggregates. To prevent this from occurring, it is necessary to rotate the grinder at very high speed ((10-13000 rpm) for a 200 mm ring) in order to self-clean the apparatus by centrifugal action. This method is not widespread industrially due to the technology of the apparatus and its limited throughput. In fact, at a maximum water throughput of 10 m$^3$/h with a 200 mm ring in a concentration of 0.5%, only 50 kg/h of polymer is batched with problems of grid clogging and very short apparatus service life.

The problem that the invention therefore proposes to solve is to develop an installation for the flocculation of sludge loaded with suspended matter that uses a dispersion apparatus of the same type as the one previously described and which allows to disperse large quantities of polymer, in a high concentration, without the risk of clogging the grinding device.

BRIEF SUMMARY OF THE INVENTION

For this purpose, the Applicant has developed an installation for the flocculation of water or sludge loaded with suspended matter comprising in succession:
a storage hopper for water-soluble polymer having a standard grain size distribution,
a grinding device for dispersing the polymer,
means for transferring the polymer solution to the water or the sludge to be treated.

The installation is characterized in that the grinding device comprises:
a wetting cone in which the polymer is metered usually using a metering screw, the said cone being connected to a primary water inlet circuit,
at the bottom end of the cone:
a chamber for grinding and draining the dispersed polymer comprising:
a rotor driven by a motor and equipped with knives optionally tilted with respect to the radius of the rotor,
a fixed stator consisting of blades optionally tilted with respect to the radius of the rotor and uniformly spaced,
the rotor/stator assembly for wet grinding of the polymer,
on all or part of the periphery of the chamber, a ring fed by a secondary water circuit, the ring communicating with the chamber for the spraying of pressurized water on the blades of the stator and thereby releasing the ground and swollen polymer on the surface of the said blades,
the assembly serving to decrease the speed of rotation and increase the concentration of the dispersion leaving the grinding chamber.

In the rest of the description and in the claims, "polymer of standard grain size distribution" means powders having a grain size distribution between 0.15 and 1 mm.

In other words, the invention consists in having developed an installation in which the grinding device has been modified for increasing the polymer concentration in the dispersion without necessarily clogging the said grinding device (thanks to the injection of pressurized secondary water while maintaining a low speed of rotation), and this, for high polymer throughputs (in practice higher than 50 kg/h).

In practice, the dissolution of the polymer is completed:

either in the line conveying the dispersed polymer to the line in which the water to be treated containing the suspended matter flows, and this, on the assumption that the transport line is long enough to permit a sufficiently long residence time for dissolution, or in contact with the sludge to be treated.

According to a first feature, the polymer is wet in the cone by overflow, the cone being equipped in this case with a double jacket at the base of which the primary water inlet circuit is connected. Alternately, this wetting can also take place in a cone by any other means well known to a person skilled in the art, for example spray nozzles or a flat jet.

In practice, the rotor is equipped with 2 to 20 knives, advantageously between 4 and 12. However, depending on the rotor diameter, the number of knives may vary. Similarly, the number of blades of the stator is variable according to the diameter thereof. In practice, it is between 50 and 300, advantageously between 90 and 200 for a rotor diameter of 200 mm. Moreover, and according to another feature, the knives are optionally more or less tilted with respect to the radius of the rotor. Advantageously, this tilt is between 0 and 15°, preferably between 2 and 10°.

In one advantageous embodiment, the rotor knives are not tilted, while the stator blades are tilted.

According to another feature, the distance between the blades of the stator is between 50 and 800 microns. For effective grinding, the distance between the knives of the rotor and the blades of the stator is between 50 and 300 microns, advantageously between 100 and 200 microns, in practice about 100 microns. Advantageously, the blades of the stator are tilted, advantageously at an angle smaller than 10° to the radius of the rotor. These blades are either assembled in a casing, or cut in the mass of a metal or of a high strength compound.

In practice, the polymer having a grain size distribution of between 0 and 1000 µm is ground in wet medium, particularly into particles of size 0-100, 0-200, 0-300, 0-500 µm according to the spacing of the knives which confer a maximum predefined dissolution time on the device.

Furthermore, concerning the peripheral ring, it communicates with the grinding and draining chamber via perforations in the form of holes, slits or equivalent, whereof the size and distribution on the ring are such that the secondary water can be propelled on the blades of the stator at a pressure serving to prevent the clogging by the gelled polymer, of the spaces between the blades. Accordingly, the pressure applied by the rotor pump effect can be sharply decreased without a risk of clogging. The smaller the spacing of the blades, the higher the pressure required for continuous operation.

Obviously, the storage hopper allows the continuous feed and receives the polymer either in bulk (lorries) or in bags of various capacities.

A further subject of the invention is a method for flocculating water or sludge loaded with suspended matter implementing the installation described above.

According to this method, in continuous or batch mode:
the grinding device is fed with polymer having a standard grain size distribution,
in the grinding device:
the polymer is prewetted in the wetting cone by a quantity of primary water,
then, instantaneously, in the grinding and draining chamber, the size of the prewetted polymer is reduced by chopping the polymer between the knives of the rotor and the blades of the stator,
then, the pressurised secondary water from the peripheral ring is used to clear the interstices between the blades of the stator in which the swollen polymer is liable to be fixed,
the polymer in suspension is then introduced into the line conveying the water or sludge.

Practically, the primary water represents between 20 to 40% by weight of the total water (primary water+secondary water) whereas secondary water represents between 60 to 80% of the total water (primary water+secondary water).

Thanks to this installation, without inserting a dissolution tank, it is possible to obtain highly interesting results by applying several techniques:

Total dissolution of the polymer in the pipe after draining the polymer from the grinding device. In this case, after fine grinding, for example to 100 microns for an anionic polymer (30% anionicity) with a molecular weight of 18 million, the suspension containing 15 g/litre is pumped by a moyno pump into a tube in which it resides for 2 minutes. Total dissolution is obtained at the outlet of this tube. This solution can then be diluted to the flocculation concentration via a static mixer.

Direct injection: the polymer is placed in suspension in the grinder with a grain size distribution of 300 microns followed by direct injection of the suspension into a line for transporting sludge to be treated where the residence time is 10 minutes. A very satisfactory flocculation is obtained at the outlet of this line. This technique is particularly advantageous for dredging or the transport of mineral sludge where it is necessary to use simplified installations with very large capacity.

Dissolution in a predefined time at high concentration with in-line dilution. This technique is particularly advantageous for flocculating municipal sludge on centrifuge.

In practice, according to one feature of the method, the speed of rotation of the rotor is between 2000 and 5000 rpm, on average about 3000 rpm for a cutting diameter of 200 mm. It is between 3000 and 6000 rpm for a cutting diameter of 10 cm and between 1500 and 3000 rpm for a cutting diameter of 40 cm. More generally, according to the diameter of the rotor also referred to as cutting diameter, the peripheral rotor speed is between 20 and 40 m/s.

Furthermore, to avoid clogging the space between the stator blades by the ground polymer, the secondary water is propelled through the perforations of the ring at a pressure of at least 1 bar, usually at the mains water pressure, or 3 to 6 bar or more, for very fine intervals, in general between 1 and 10 bar.

Advantageously, the polymer is a high molecular weight homo or copolymer of acrylamide. Preferably, the acrylamide copolymer is cationic, that is using one or more cationic or anionic comonomer(s) incorporating acrylic acid or AMPS for example.

BRIEF SUMMARY OF THE DRAWING FIGURES

The invention and its advantages clearly appear from the examples described below, in conjunction with the figures appended hereto.

DETAILED DESCRIPTION

Example 1

Installation

According to the invention, the installation comprises a storage silo (not represented) for the polymer in powder form, which has, at its base, a metering screw (not represented) for transferring the polymer to the grinding device (1) under nitrogen.

Figure 1:
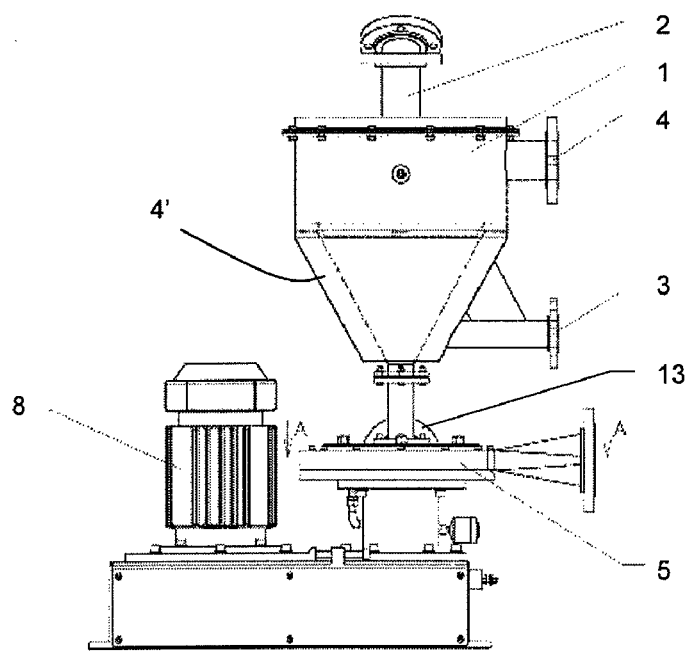
FIG. 1 is schematic side view of the grinding device.
Figure 2:
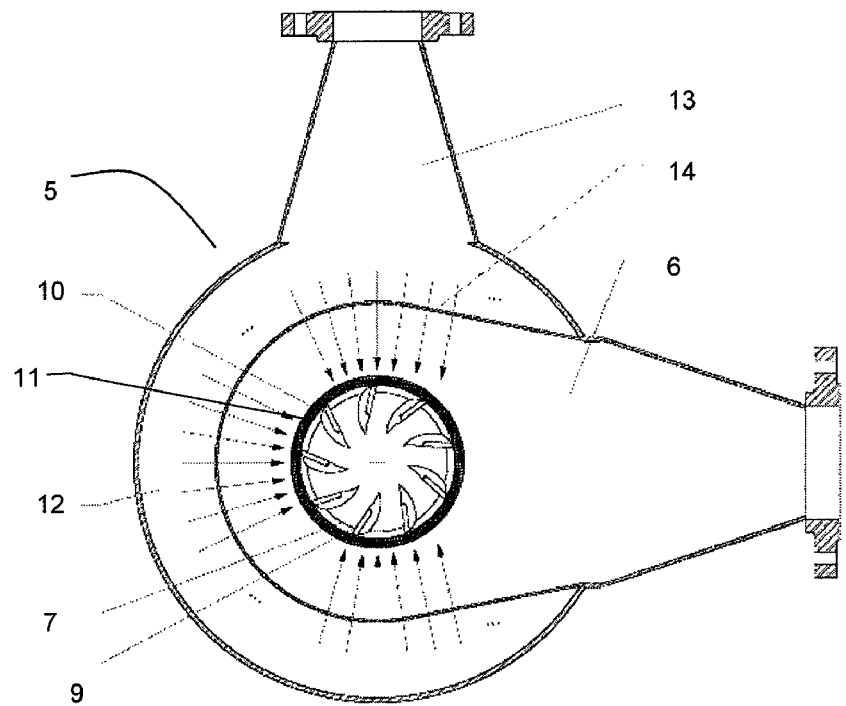
FIG. 2 is a cross-section along AA' of FIG. 1.

The grinding device is shown more particularly in FIGS. 1 and 2.

The grinding device comprises:
 a wetting cone (1) connected at its apex to a column (2) batching the standard grain size distribution polymer, usually via a metering screw, the cone (1) being connected at its bottom to a primary water inlet circuit (3) which feeds an overflow (4, 4'),
 at the bottom end of the cone, an assembly (5) comprising:
  a chamber (6) for grinding and draining the dispersed polymer (FIG. 2) comprising:
   a rotor (7) driven by a motor (8) fitted with knives (9),
   a fixed stator (10) comprising blades (11) uniformly spaced and slightly tilted with respect to the radius of the rotor,
  on all or part of the periphery of the chamber, a ring (12) fed by a secondary water circuit (13), the ring (12) communicating with the chamber (6) via slits (14) for spraying pressurised water on the blades (11) of the stator (10).

Figure 3:
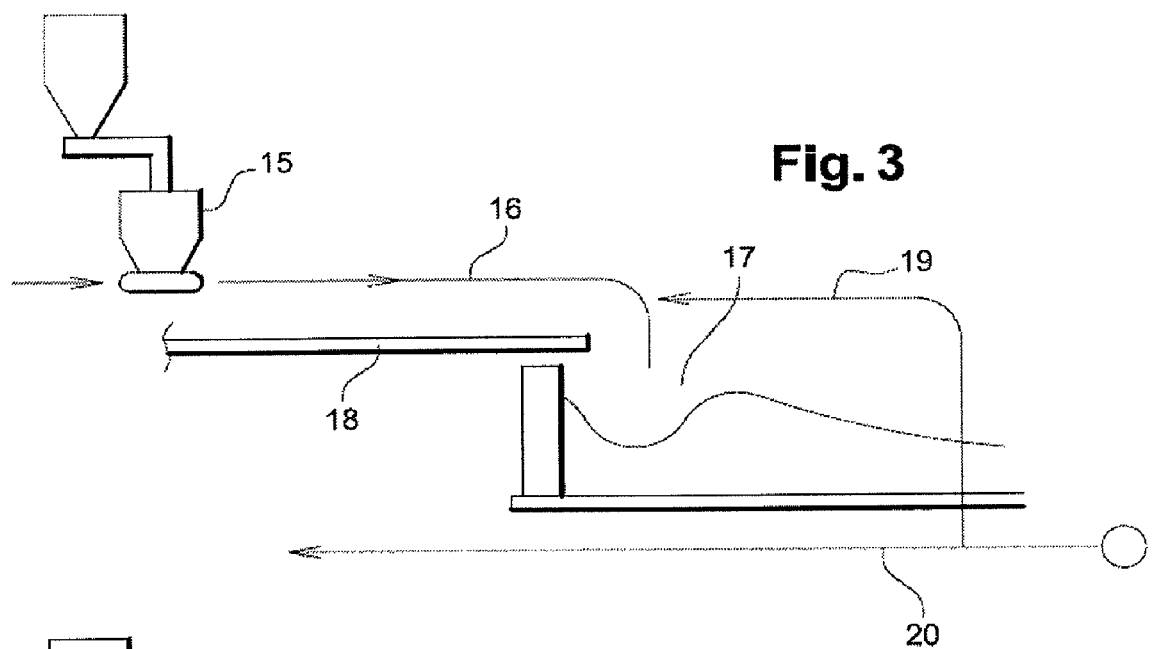
FIG. 3 is a schematic representation of an installation of the invention dedicated to the treatment of water containing suspended matter.

FIG. 3 shows an installation according to the invention for treating sludge according to a first embodiment. In this embodiment, the polymer in suspension is removed by the grinder denoted by the general reference (15), then transported via a line (16) just above the crater (17) where the sludge to be treated and circulating in the pipe (18) is basined. The line (16) is sufficiently long and voluminous to permit complete dissolution of the polymer before its contact with the sludge. Depending on the polymer flow rate, it is possible to dilute the said polymer before its contact with the sludge thanks to the addition of water via a line (19) fed partly by the water (20) recovered on completion of the treatment.

Figure 4:
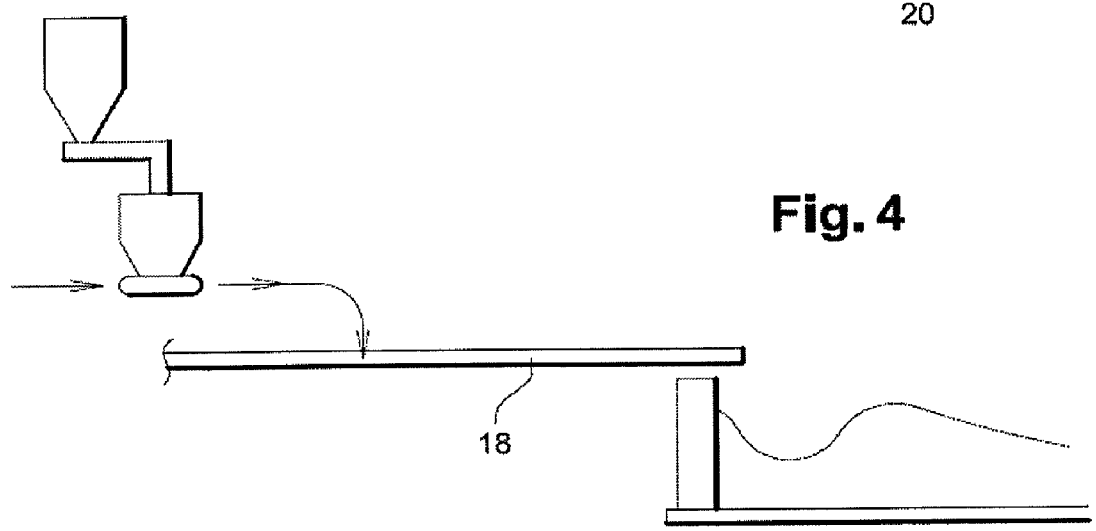
FIG. 4 is a schematic representation of an installation of the invention dedicated to the treatment of mineral sludge.

FIG. 4 shows an installation of the same type, but with the difference that the polymer is not injected directly into the crater, but into the pipe (18) transporting the diluted sludge.

Figure 5:
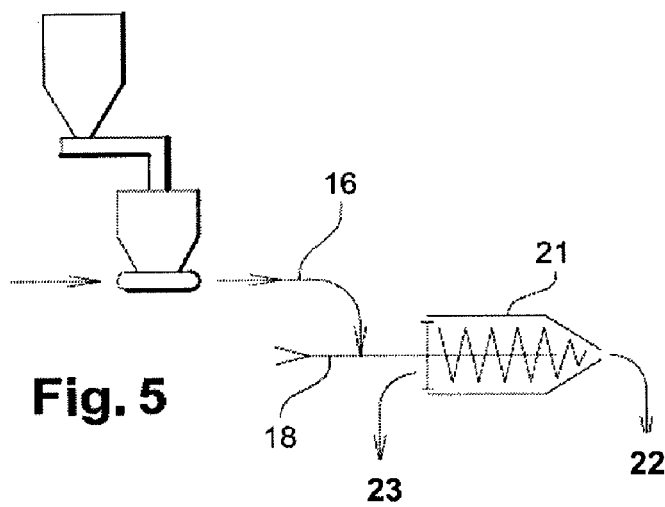
FIG. 5 is a reproduction of the installation of the invention dedicated to the treatment of municipal sludge.

FIG. 5 is another embodiment more particularly suitable for treating municipal sludge. In this system, the polymer is injected via the line (16) into the line (18) in which the sludge flows, the sludge then being centrifuged in the device (21). The concentrated sludge (22) and the supernatant (23) are then removed from the device (21).

Example 2

Application

In a phosphate mine, the wastes after separation contain a mixture of clay and sand in a concentration of 130 g/litre. The throughput of sludge to be treated is 900 m³/h. This suspension is sent to basins formed of earth embankments on three sides (measuring 1840×850 m with a height of 5 metres) located about 2500 metres from the washing plant.

The laboratory tests show that the quantity of polymer necessary for rapid settling (>10 m/hour) in order to recycle the water is about 70 ppm.

The Installation (see FIG. 3):
 The equipment used comprises:
  1) A 60 m³ silo containing the polymer and fed by bulk lorry.
  2) A grinding device according to the invention whereof the technical characteristics and dissolution conditions are given in the table below.

|  | "PSU 300" |
|---|---|
| Technical features of the grinding unit | |
| Cutting diameter in mm (rotor size) | 200 |
| Number of fixed knives | 90 |
| Height of fixed knives in mm | 16.6 |
| Spacing between knives | 300 microns |
| Spacing between fixed/mobile knives | 100 microns |
| Cutting angle | 3° |
| Number of mobile knives (i.e.: on the rotor) | 6 |
| Rotor speed | 3000 rpm |
| Rotor power | 7.5 kW |
| Dispersion characteristics | |
| Primary water flow rate | 10 m3/h |
| Anionic polyacrylamide flow rate (anionicity 30%; molecular weight 19 million; grain size distribution 0-1000) | 84 kg/h |
| Secondary water flow rate in the concentric ring surrounding the stator (pressure 2 bar) | 20 m3/h |
| Final concentration of dispersion | 2.8 g/l |
| Final pressure | 1.5 bar |

Pumping distance by Moyno pump: 2500 m
Pressure of Moyno pump: 9 bar
Introduction point in the pump: 10 metres before the basin The flocculent (polymer) and the sludge are mixed on arrival in the storage basin by two separate pipes.

At the basining point, a crater is formed, where very large flocs flow with a clear water that is repumped at the end of the basin for use in the washing plant. No intermediate dissolution tank has been used. Optimization of the flocculation concentration by post-dilution is nevertheless possible just before the mixing with the sludge, this dissolution taking place by withdrawal of the treated water by a bypass after the recirculation pump to the washing plant.

To obtain an identical result with direct injection of the powder by dissolution of the polymer, the consumption observed is about 180 kg/h, or an extra consumption of more than 100% compared to the invention.

Example 3

Dredging has been carried out by a suction dredger with a capacity of 600 m³/h. The suspension pumped has an average solid matter concentration of 150 g/litre comprising 85% of sand and 15% of silt. In the laboratory, flocculation is obtained with 50 ppm polymer for a settling rate of 35 m/h.

This suspension is sent to basins of indeterminate shape with an earth embankment of 6 metres and a water flow at ground level on the opposite side to the supply side. The distance between the two is about 500 metres.

The Installation:
 The equipment used comprises a grinding device according to the invention (PSU) whereof the technical characteristics and dissolution conditions are given in the table below.

| | "PSU 100" |
|---|---|
| Technical features of the grinding unit | |
| Cutting diameter in mm (rotor size) | 100 |
| Number of fixed knives | 50 |
| Height of fixed knives in mm | 16.6 |
| Spacing between knives | 300 microns |
| Spacing between fixed/mobile knives | 100 microns |
| Cutting angle | 2° |
| Number of mobile knives (i.e.: on the rotor) | 4 |
| Rotor speed | 5000 rpm |
| Rotor power | 3 kW |
| Dispersion characteristics | |
| Primary water flow rate | 3 m3/h |
| Anionic polyacrylamide flow rate (anionicity 25%; molecular weight 17 million) | 41 kg/h |
| Secondary water flow rate in the concentric ring surrounding the stator (pressure 2 bar) | 8 m3/h |
| Final concentration of dispersion | 3.7 g/l |
| Final pressure | 0.9 bar |

Transport by Moyno type pump: distance 800 m: delivery: 11 m³/h

Pressure of Moyno pump: 5 bar

Introduction point of polymer: directly on arrival of suspension in the basin.

The arrival of the sludge forms a large diameter crater and the polymer solution is introduced directly into the crater, which rises in height due to the flocculation. The crater thus formed serves as a natural "flocculator".

One possible alternative, when the suspension mainly contains suspended matter of the colloidal type, consists in pouring the suspension and polymer issuing from the grinding unit into an open tank where the flocculation takes place supplying the basin by overflow.

According to the installation of the invention, it is possible to pump the polymer dispersion that then dissolves completely in the line before injection or directly into the suspension to be treated.

Example 4

A municipal sludge containing 25% primary sludge and 75% biological sludge and containing 59.4% volatile matter is fed to a 70 cm diameter centrifuge.

In a first case, a cationic polyacrylamide with a molecular weight of 14 million and a cationic charge of 55 moles % is dissolved in a standard dissolution tank to a concentration of 3 g/litre in a dissolution time of 1 hour. The time of use of this tank is 8 hours. After adjustments and optimization, the following parameters were obtained:
 sludge concentration: 4.2%
 machine throughput: 59.5 m³/h
 quantity of polymer: 8.9 kg/tonne of dried sludge
 concentration of centrifuged sludge: 24.4%
 concentration of water containing suspended matter on completion of centrifugation: 1.58 g/litre.

In a second case, a device of the invention is used with grinding heads permitting cutting to about 200 microns. The suspension containing 20 g/litre is sent into a pipe with a residence time of 2 minutes, then diluted in-line to a concentration of 3 g/litre and injected directly into the centrifuge. After adjustments and optimization, the following parameters were obtained:
 sludge concentration: 4.4%
 machine throughput: 64.2 m³/h
 quantity of polymer: 7.8 kg/tonne of dried sludge
 concentration of centrifuge: 25.7%.

The apparatus therefore allows to use the property of the polymers, that is, their combination during dissolution into very high molecular weight aggregates and not into a linear structure.

The invention claimed is:

1. Installation for use in the flocculation of water or sludge loaded with suspended matter comprising in succession:
 a storage hopper for water-soluble polymer having a standard grain size distribution,
 a grinding device for dispersing the polymer as a polymer suspension, and
 means for transferring the polymer suspension to the water or the sludge to be treated, wherein the grinding device comprises:
  a wetting cone in which the polymer is batched, said cone being connected to a primary water inlet circuit,
  at a bottom end of the cone:
   a chamber for grinding and draining the dispersed polymer comprising:
    a rotor driven by a motor and equipped with knives,
    a fixed stator having blades,
   on all or part of a periphery of the chamber, a ring fed by a secondary water circuit, the ring communicating with the chamber for the spraying of pressurized water on the blades of the stator and thereby releasing ground and swollen polymer on a surface of the said blades.

2. Installation according to claim 1, wherein the knives are tilted with respect to a radius of the rotor.

3. Installation according to claim 2, wherein the knives are tilted by an angle of between 0 and 15° to the radius of the rotor.

4. Installation according to claim 2, wherein the knives are tilted by an angle of between 2 and 10° to the radius of the rotor.

5. Installation according to claim 1, wherein the blades are tilted with respect to the radius of the rotor and uniformly spaced.

6. Installation according to claim 1, wherein a first distance between the blades of the stator is between 50 and 800 microns, while a second distance between the knives of the rotor and the blades of the stator is between 50 and 300 microns.

7. Installation according to claim 6, wherein the second distance is between 100 and 200 microns.

8. Method for flocculating water or sludge loaded with suspended matter, comprising: employing the installation according to claim 1 to form the polymer suspension, and transferring the polymer suspension to the water or sludge to flocculate the suspended matter.

9. Method according to claim 8, wherein, in continuous mode:
 the grinding device is fed with polymer having a standard grain size distribution,
 in the grinding device:
  the polymer is prewetted in the wetting cone by a quantity of primary water,
  then, instantaneously, in the grinding and draining chamber, size of the prewetted polymer is reduced by chopping the polymer between the knives of the rotor and the blades of the stator,
  then, the pressurised secondary water from the peripheral ring is used to clear interstices between the blades of the stator in which the swollen polymer is liable to be fixed, and polymer in suspension is then introduced into a line in which the water or sludge to be treated flows.

10. Method according to claim 9, wherein peripheral speed of rotation of the rotor is between 20 and 40 m/s.

11. Method according to claim 9, wherein the secondary water is propelled under a pressure of between 1 and 10 bar.

12. Method according to claim 9, wherein the secondary water is propelled under a pressure of between 3 and 6 bar.

13. Method according to claim 8, wherein the polymer comprises a polyacrylamide.

* * * * *